(12) United States Patent
Yuan et al.

(10) Patent No.: US 12,209,628 B2
(45) Date of Patent: Jan. 28, 2025

(54) BRAKE PAD WEAR DETECTION AND WARNING FOR AUTONOMOUS DRIVING VEHICLES

(71) Applicant: Apollo Autonomous Driving USA LLC, Sunnyvale, CA (US)

(72) Inventors: Baoping Yuan, Sunnyvale, CA (US); Yaoming Shen, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 99 days.

(21) Appl. No.: 18/147,567

(22) Filed: Dec. 28, 2022

(65) Prior Publication Data

US 2024/0218911 A1    Jul. 4, 2024

(51) Int. Cl.
*B60Q 1/00* (2006.01)
*F16D 66/02* (2006.01)

(52) U.S. Cl.
CPC ......... *F16D 66/027* (2013.01); *F16D 66/028* (2013.01)

(58) Field of Classification Search
CPC .. F16D 66/027; F16D 66/028; F16D 65/0006; F16D 66/02; F16D 2066/006; B60T 8/171; B60T 8/885; B60T 17/221; B60T 2270/406; H04R 3/00; H04R 29/00; H04R 2420/07; B60K 35/00; B60K 35/22; B60Y 2400/81
USPC ................. 340/454, 453, 425.5, 429, 426.32
See application file for complete search history.

(56) References Cited

U.S. PATENT DOCUMENTS

| | | | |
|---|---|---|---|
| 4,266,633 A * | 5/1981 | Barabino | F16D 66/028 188/1.11 W |
| 2019/0093722 A1 * | 3/2019 | Patel | B60T 8/885 |
| 2023/0228310 A1 * | 7/2023 | Toy | F16D 66/021 188/1.11 W |
| 2024/0051524 A1 * | 2/2024 | Ghannam | B60W 30/18163 |

* cited by examiner

*Primary Examiner* — Anh V La
(74) *Attorney, Agent, or Firm* — WOMBLE BOND DICKINSON (US) LLP (57) ABSTRACT

Sound signals are received by a plurality of microphones disposed on a top of an ADV. An analysis of the sound signals is performed based on a spectrum and a vibration intensity of the sound signals. A wheel which the sound signals come from and a thickness of a brake pad of the wheel is determine based on the analysis of the sound signals. A brake pad wear degree of the brake pad and how long the ADV can run with the brake pad within a safety range is determined. A warning message indicating warning information based on the brake pad wear degree is transmitted.

20 Claims, 9 Drawing Sheets

BRAKE PAD WEAR DETECTION AND WARNING FOR AUTONOMOUS DRIVING VEHICLES

TECHNICAL FIELD

Embodiments of the present disclosure relate generally to operating autonomous driving vehicles. More particularly, embodiments of the disclosure relate to the detection of braking problems for an autonomous driving vehicle (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. It is important to control the ADV to avoid accidents. According to the American transaction department, 5% of crash accidents were caused by braking problems. For example, the brake pad is in need of replacement because of the brake pad wear. The brake pad wear detection is important for the ADV, because the brake distance will be longer if the brake pad is not being changed immediately. However, it is difficult to detect the brake pad wear correctly and send warning information to the control system.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, the abrasion of a brake pad of an ADV may be detected rapidly and an appropriate warning may be generated. Multiple microphones on the top of the ADV may be used to detect the sound frequency and vibration intensity from the brake pads of the four wheels during the ADV moving and braking. The characteristics of sensor vibration of the brake pads of different companies may have been previously stored in the ADV. The measured sound waves may be pre-processing including filtering and normalization of the sound waves. Then the analysis of the spectrum and vibration intensity of the pre-processed sound waves may be performed to identify a wheel which the sound waves come from. The thickness of a brake pad of the wheel may be estimated. In addition, the ADV may try to find out if any key words such as "noise", or "brake pad noise" come from a user/passenger inside the ADV. Based on the results of the analysis, the degree of brake pad wear and how long the ADV scan run within the safety range may be estimated. Different levels of the brake pad wear may be. Based on the different levels of the brake pad wear, the warning message may be sent to the server with corresponding warning information displayed appropriately. The sound noise of the brake pad wear may last a period of time to be detected. The sound noise of the brake pad wear may include active noise from the ADV, e.g., noise from a brake pad wear sensor, and/or passive noise, e.g., noise from the abrasion of the brake pad, the overuse or problematic noise of the brake pad.

According to some embodiments, sound signals are received by a plurality of microphones disposed on a top of an ADV. An analysis of the sound signals is performed based on a spectrum and a vibration intensity of the sound signals. A wheel which the sound signals come from and a thickness of a brake pad of the wheel is determine based on the analysis of the sound signals. A brake pad wear degree of the brake pad and how long the ADV can run with the brake pad within a safety range is determined. A warning message indicating warning information based on the brake pad wear degree is transmitted.

In one embodiment, the plurality of microphones may be disposed at four corners on the top of the ADV. In one embodiment, whether the sound signals come from a brake pad of a plurality of brake pads of the ADV may be determined.

In one embodiment, the analysis of the sound signals may be performed based on characteristics of a plurality of brake pads previously stored. In one embodiment, the analysis of the sound signals may be performed further based on vehicle information of the ADV.

In one embodiment, the sound signals may be pre-processed the sound signals including filtering and normalizing the sound signals.

In one embodiment, one or more predefined key words from a user of the ADV may be detected using speech recognition.

In one embodiment, a plurality of brake pad wear levels and a plurality of warning levels may be set up, where each brake pad wear level of the plurality of brake pad wear levels may correspond to a warning level of the plurality of warning levels.

In one embodiment, a brake pad wear level of the plurality of brake pad wear levels and a waring level of the plurality of warning levels may be determined based on the brake pad wear degree.

In one embodiment, the warning message may be generated based on the brake pad wear level, where the warning information may be displayed based on the warning level.

Figure 1:
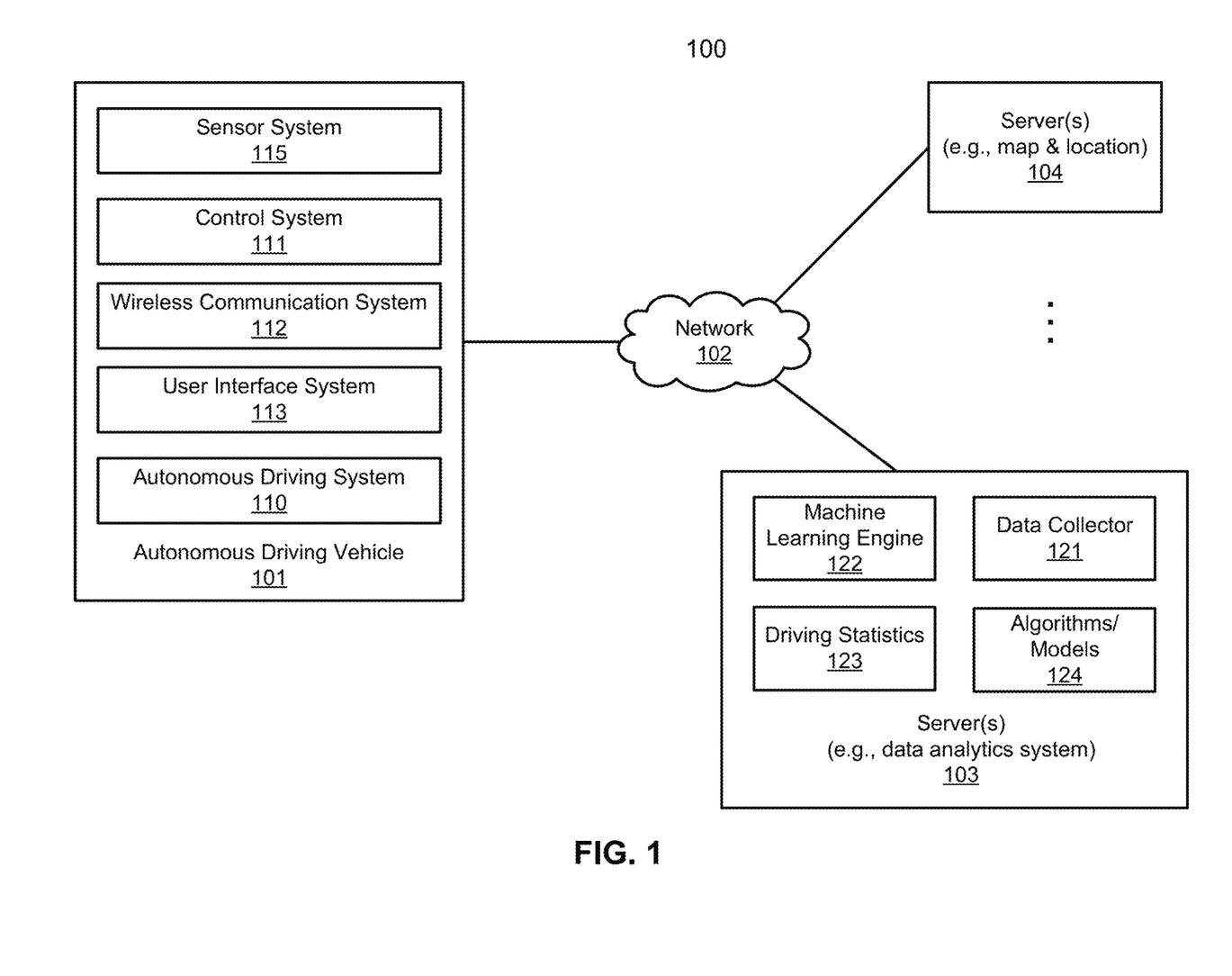
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
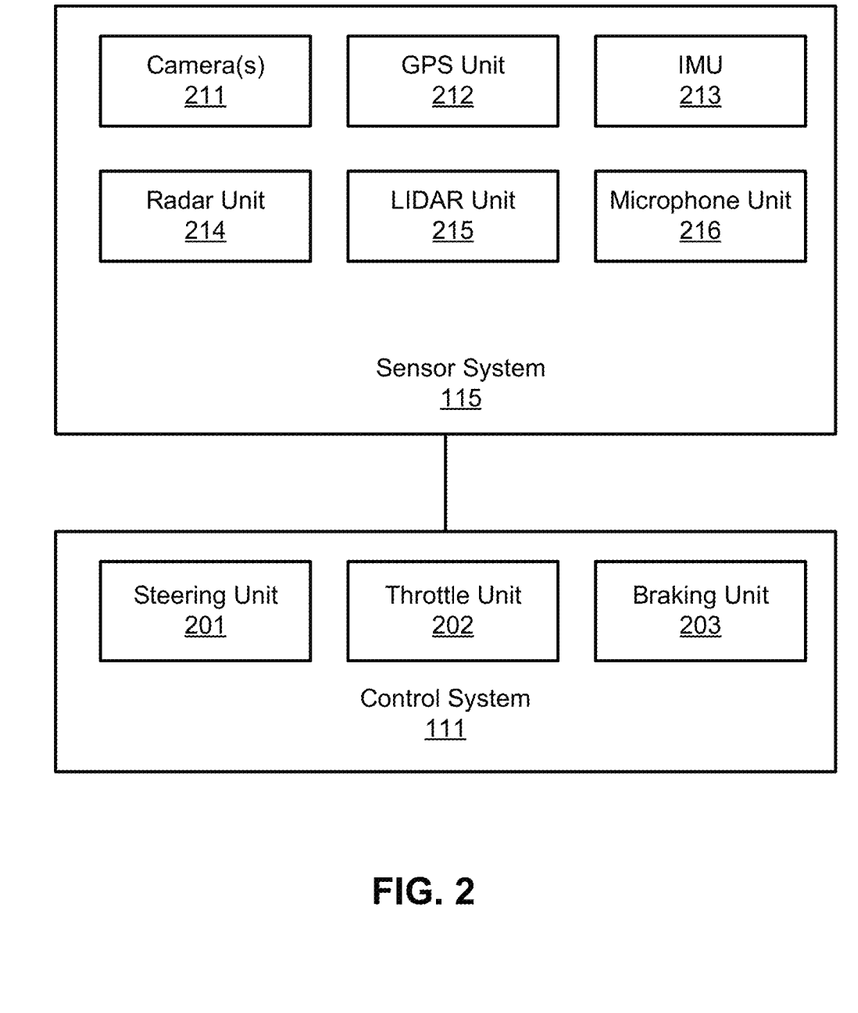
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, a light detection and range (LIDAR) unit 215, and a microphone unit 216. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform. Microphone unit 216 may include one or more microphones mounted inside tires or wheel hubs of the ADV, or at a bottom panel of the ADV. The one or more microphones may be disposed to collect sound signals from the road to detect a road condition.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm or model to receive sound signals by a plurality of microphones disposed on a top of the ADV, an algorithm or model to perform an analysis of the sound signals based on a spectrum and a vibration intensity of the sound signals, an algorithm or model to determine a wheel which the sound signals come from and a thickness of a brake pad of the wheel based on the analysis of the sound signals, an algorithm or model to determine a brake pad wear degree of the brake pad and how long the ADV can run with the brake pad within a safety range based on the thickness of the brake pad, and an algorithm or model to transmit a warning message indicating warning information based on the brake pad wear degree. Algorithms 124 can then be uploaded on ADVs to be utilized during autonomous driving in real-time.

Figure 3A:
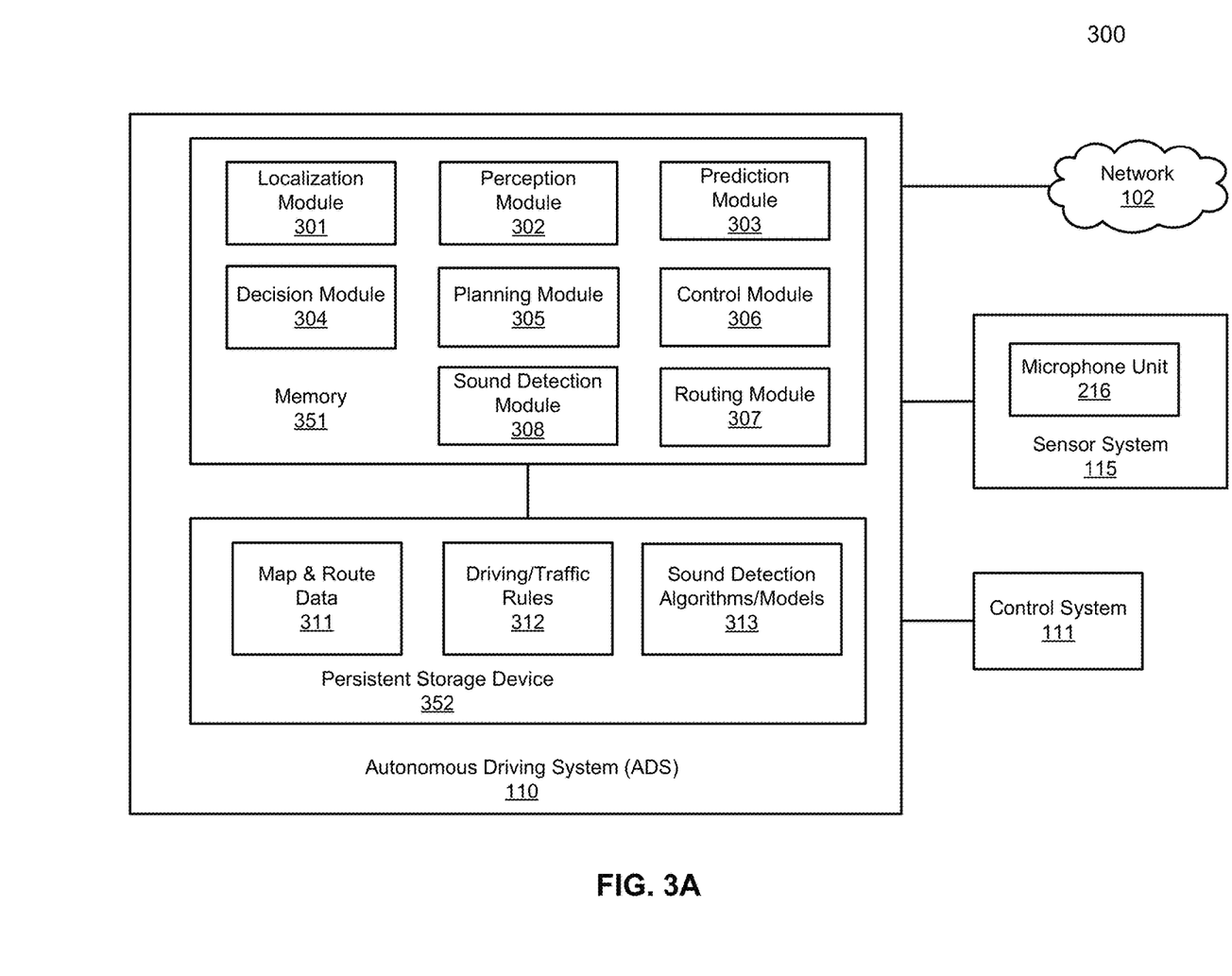
FIGS. 3A-3B are block diagrams illustrating an example of an autonomous driving system used with an autonomous driving vehicle according to one embodiment.
Figure 3B:
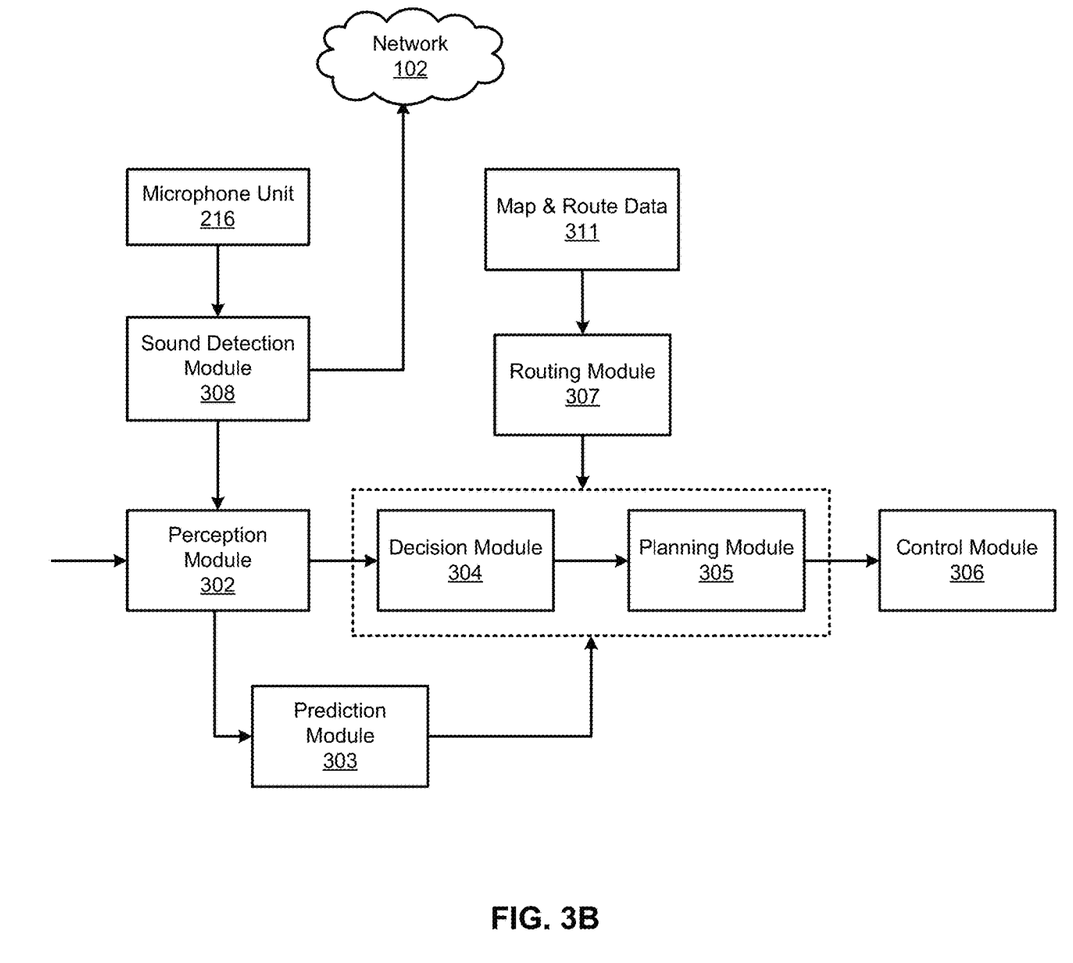

FIGS. 3A-3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and brake pad wear detection module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

Based on sound signals provided by microphone unit 216, a wheel which the sound signals come from and a thickness of a brake pad of the wheel is determined by sound detection module 308. The sound detection module 308 determines a brake pad wear degree of the brake pad and how long the ADV can run with the brake pad within a safety range based on the thickness of the brake pad. Sound detection module 308 may include a computer audio system or functionalities of a computer audio system. Sound detection module 308 may process and analyze sound signals captured by one or more microphones based on sound detection algorithms or models 313, or algorithms or models 124. Frequency and energy features of the sound signals may be evaluated using machine learning algorithm or models and/or deep learning algorithm or models. The sound detection algorithms or models 313 may include machine learning algorithm or models and/or deep learning algorithm or models. The brake pad wear degree of the brake pad and how long the ADV can run with the brake pad within the safety range may be determined based on the frequency and energy features of the sound signals. Based on the brake pad wear degree, the warning message may be sent to the server through the network 102 with corresponding warning information being displayed appropriately. Although sound detection module 308 is shown as a separate module, sound detection module 308 may also be implemented as a part of perception module 302, prediction module 303, and/or decision module 304. Alternatively, sound detection module 308 may be a separate module communicatively coupled to modules 302-306, for example, via an application programming interface (API).

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
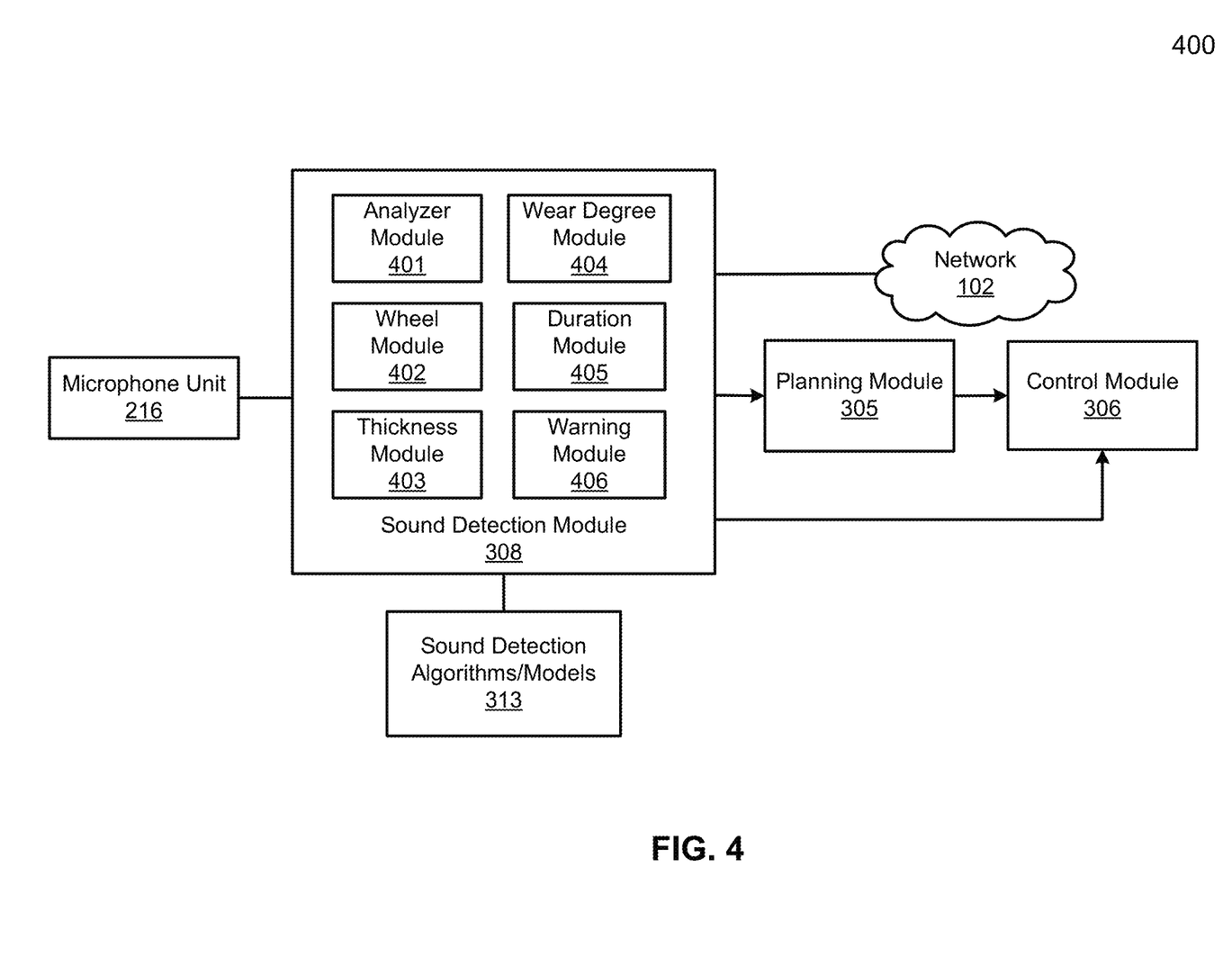
FIG. 4 is a block diagram illustrating an example of a sound detection module of an autonomous driving vehicle according to one embodiment.

FIG. 4 is a block diagram illustrating an example of the sound detection module 308 of the ADV 101 according to one embodiment. Referring to FIG. 4, sound detection module 308 includes, but is not limited to, analyzer module 401, wheel module 402, thickness module 403, wear degree module 404, duration module 405, warning module 406, which work together using sound detection algorithms or models 313 to detect a brake pad wear of the ADV.

In one embodiment, sound signals are received by multiple microphones in the microphone unit 216 disposed on the top of the ADV. Based on sound signals from the multiple microphones, analyzer module 401 is configured to analyze the sound signals based on a spectrum and a vibration intensity of the sound signals. Analyzer module 401 may process and analyze sound signals captured by one or more microphones based on sound detection algorithms or models 313, or algorithms or models 124.

Based on sound signals provided by the microphone unit 216, wheel module 402 is configured to determine a wheel which the sound signals come from. Thickness module 403 is configured to determine a thickness of a brake pad of the wheel. Wear degree module 404 is configured to determine a brake pad wear degree of the brake pad. Duration module 405 is configured to determine how long the ADV can run with the brake pad within the safety range based on the thickness of the brake pad. For example, the thickness of the brake pad may have to be larger than a predetermined threshold thickness. The brake pad wear degree of the brake pad and how long the ADV can run with the brake pad within the safety range may be determined based on the frequency and energy features of the sound signals. Based on the brake pad wear degree, warning module 406 may generate a warning message to the server through the network 102 with corresponding warning information being displayed appropriately.

Figure 5:
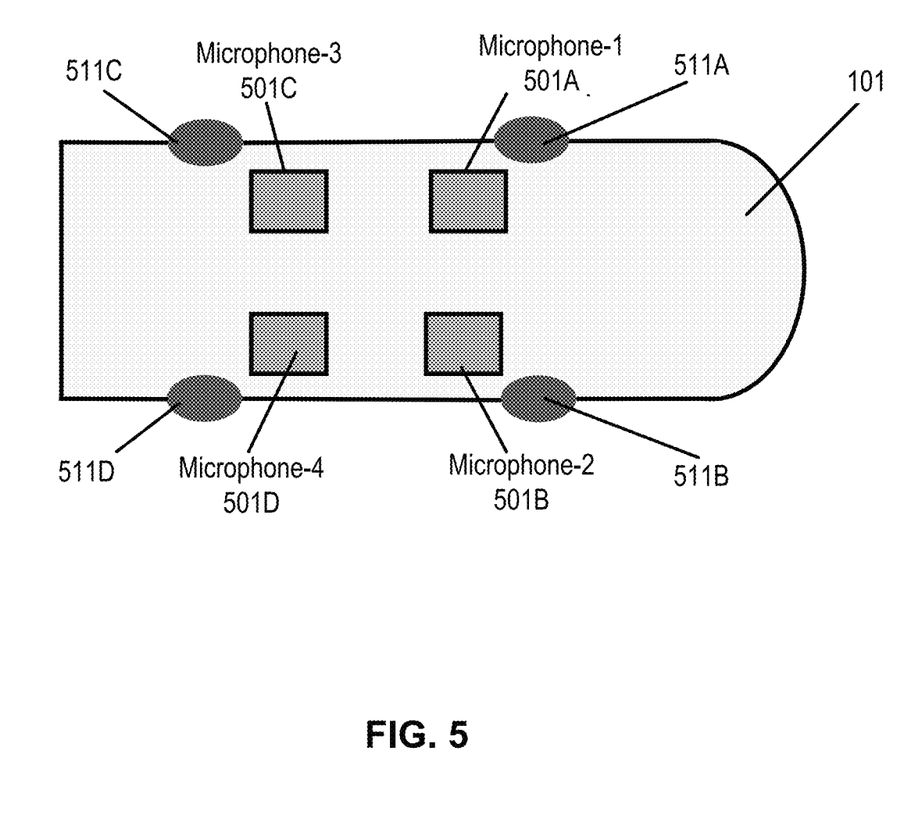
FIG. 5 is a diagram illustrating an example of using microphones for brake pad wear detection in an autonomous driving vehicle according to one embodiment.

FIG. 5 is a diagram illustrating an example of using microphones (e.g., 501A-501D) for brake pad wear detection in the ADV 101 according to one embodiment. As illustrated in FIG. 5, multiple microphones may be mounted on the top of the ADV 101. For example, four microphones 501A-501D may be mounted at four corners on the top (e.g., roof) of the ADV 101. The ADV 101 may have multiple brake pads. For example, the ADV 101 may have a brake pad for each of the four wheels (e.g., 511A, 511B, 511C, and 511D). The four microphones 501A-501D may receive sound signals (e.g., sounds waves) simultaneously. Based on sound signals received from the four microphones 501A-501D, the spectrum of the sound signals as well as the vibration intensity of the sound signals may be analyzed. The characteristics of the sound signals of a plurality of brake pads of a plurality of companies may be stored in the database of the ADV 101. The vehicle information of the ADV 101 including the information of the brake pads of the wheels (e.g., 511A, 511B, 511C, and 511D) as well as other information of the ADV 101 may be stored in the database of the ADV 101. Based on the sound information and the vehicle information, one or more wheels (e.g., 511A, 511B, 511C, and/or 511D) which the sound signals come from may be determined. The thickness of the brake pad of the wheel which the sound signals come may also be determined. Accordingly, the brake pad wear degree of the brake pad and how long the ADV can run with the brake pad within the safety range may be determined based on the frequency and energy features of the sound signals. The warning message may be sent to the server through the network 102 with corresponding warning information being displayed appropriately.

Figure 6A:
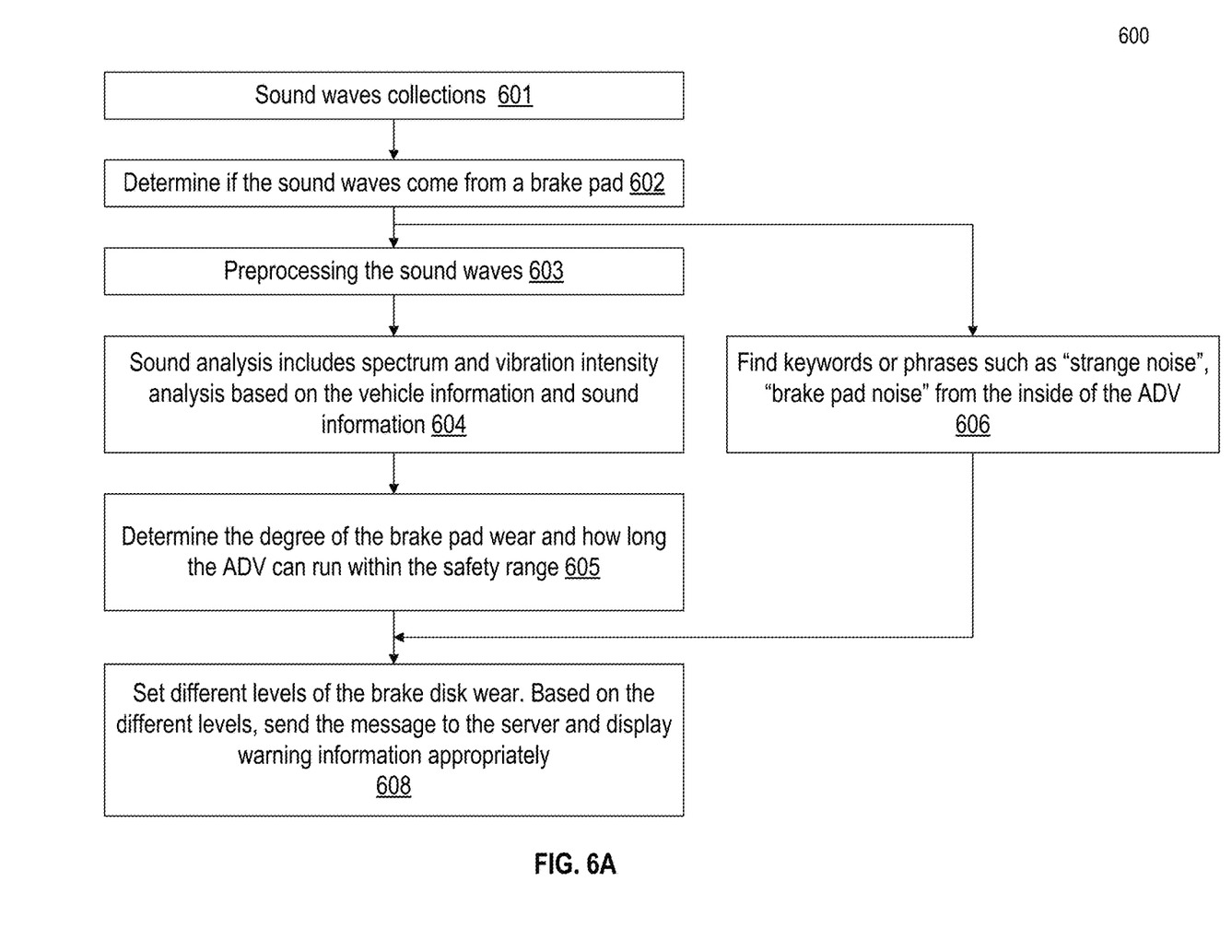
FIG. 6A is a flow diagram illustrating an example of detecting a brake pad wear of an autonomous driving vehicle according to one embodiment.

FIG. 6A is a flow diagram illustrating an example of detecting a brake pad wear of the ADV 101 according to one embodiment. Referring to FIG. 6A, at block 601, sound waves are collected by multiple microphones (e.g., 501A-501D) mounted on the top of the ADV 101.

At block 602, whether the sound waves come from a brake pad of the ADV is determined. For example, the ADV 101 may have a brake pad for each of the four wheels (e.g., 511A, 511B, 511C, and 511D). By using multiple microphones (e.g., 501A-501D) mounted on multiple locations on the top of the ADV 101, the brake pad which the sound waves come from may be determined. For example, four microphones 501A-501D may be mounted on four corners on the top of the ADV 101 as illustrated in FIG. 5, by analyzing the sound spectrum and the sound intensities from the four microphones 501A-501D, the brake pad which the sound waves come from may be determined.

At block 603, the sound waves may be preprocessed. For example, the preprocessing may include filtering the sound waves by using predetermined filters. The preprocessing may also include normalizing the sound waves.

At block 604, sound analysis includes spectrum and vibration intensity analysis is performed based on the vehicle information and the sound information. For example, the sound information may include the spectrum and the vibration intensity of the sound waves. The vehicle information of the ADV 101 may include the information of the brake pads of the wheels (e.g., 511A, 511B, 511C, and 511D) as well as other vehicle information, for example, the speed of the ADV. The vehicle information of the ADV 101 may be previously stored in the database of the ADV 101. For example, the characteristics of the sound signals of a plurality of brake pads of a plurality of companies may be stored in the database of the ADV 101.

At block 605, a wheel which the sound waves/signals come from and a thickness of a brake pad of the wheel is determined. For example, the brake pad of the wheel may be the source of the abrasion noise of the sound waves/signal. Based on the thickness of the brake pad, the brake pad wear degree of the brake pad and how long the ADV can run with the brake pad within the safety range is determined.

At block 606, speech recognition may be used to find keywords or phrases such as "strange noise", "brake pad noise" from the inside of the ADV, e.g., from a user or a passenger of the ADV.

At block 608, different levels of the brake disk wear may be set up. For example, three to five different levels of the brake disk wear may be set up based on the brake pad wear degree of the brake pad. Different warning levels of the warning message may be determined based on the different levels of the brake disk wear. Based on the different levels of the brake disk wear, the warning message may be sent to the server and display corresponding warning information appropriately. For example, the warning information may be displayed based on the warning level. The higher the warning level, the more urgency the warning information may indicate. In one embodiment, the warning message may be sent to the control module of the ADV to stop the ADV, for example, if the warning level is high.

Figure 6B:
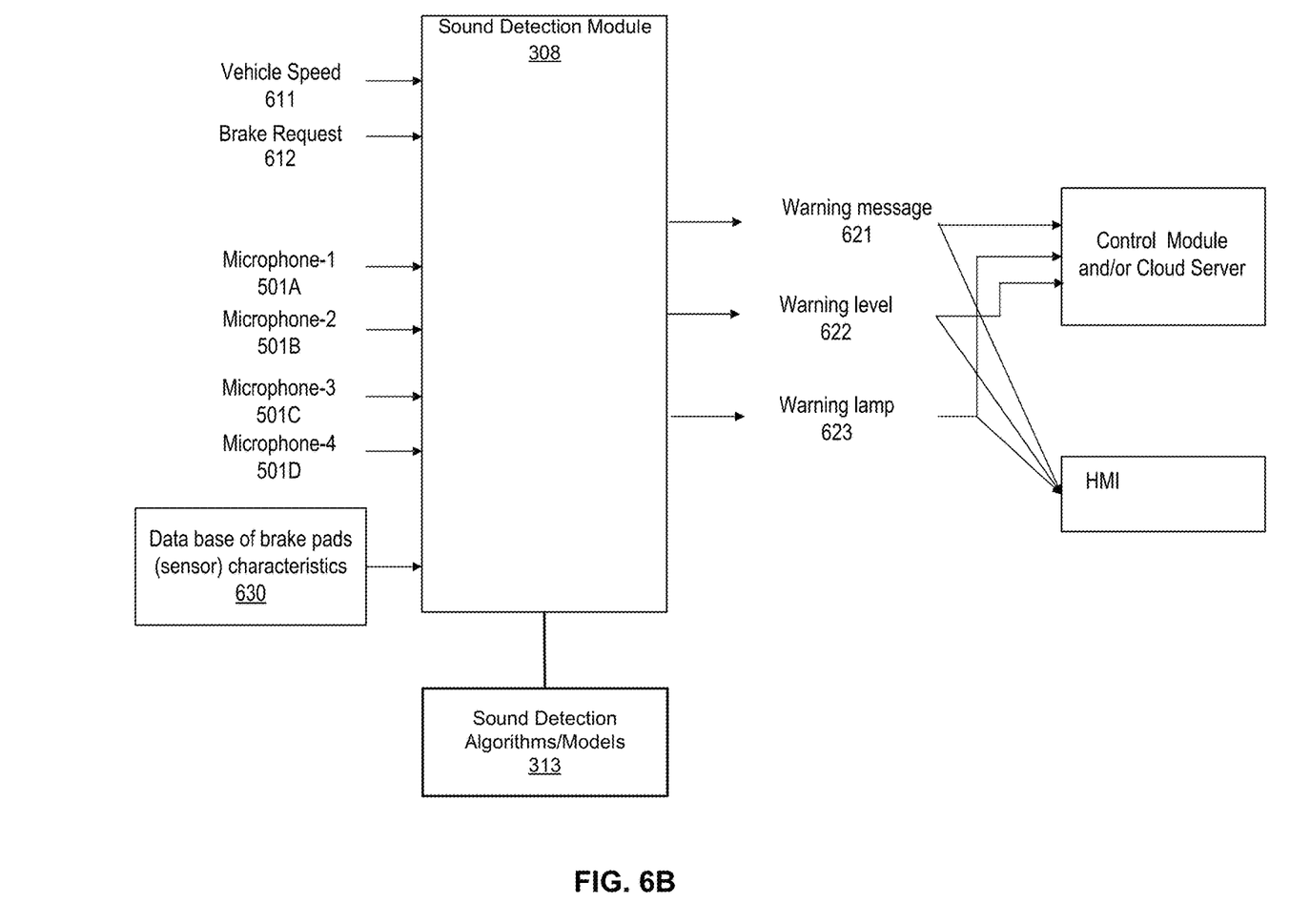
FIG. 6B is a block diagram illustrating an example of a brake pad wear detection and a warning message generation of an autonomous driving vehicle according to one embodiment.

FIG. 6B is a block diagram illustrating an example of a brake pad wear detection and a warning message generation of an autonomous driving vehicle according to one embodiment. As illustrated in FIG. 6B, a brake request 612 may be received and input into the sound detection module 308. The sound signals/waves from multiple microphones (e.g., 501A-501D) may be input into the sound detection module 308. The vehicle information of the ADV 101 may be input into the sound detection module 308. The vehicle information may include the information of the brake pads of the wheels (e.g., 511A, 511B, 511C, and 511D) as well as other vehicle information, for example, the speed 611 of the ADV. The characteristics of a plurality of brake pads of a plurality of companies stored in the database 630 may be input into the sound detection module 308.

Working with sound detection algorithms/models 313, based on the sound information, the vehicle information and the characteristics of a plurality of brake pads, the sound detection module 308 is configured to determine a wheel which the sound waves/signals come from and a thickness of a brake pad of the wheel. Based on the thickness of the brake pad, the brake pad wear degree of the brake pad and the time duration how long the ADV can run with the brake pad within the safety range is determined.

Based on the brake pad wear degree of the brake pad, the level of the brake pad wear may be determined. The warning level 622 of the warning message 621 may be determined based on the level of the brake pad wear. The warning message 621 may be sent to the control module and/or server and display corresponding warning information appropriately. In one embodiment, the warning message may be sent to the control module of the ADV to stop the ADV. In one embodiment, the warning message may be sent to server to alert the brake pad is in need to be checked/replaced. In one embodiment, a warning lamp 623 may be activated based on the warning level 622.

Figure 7:
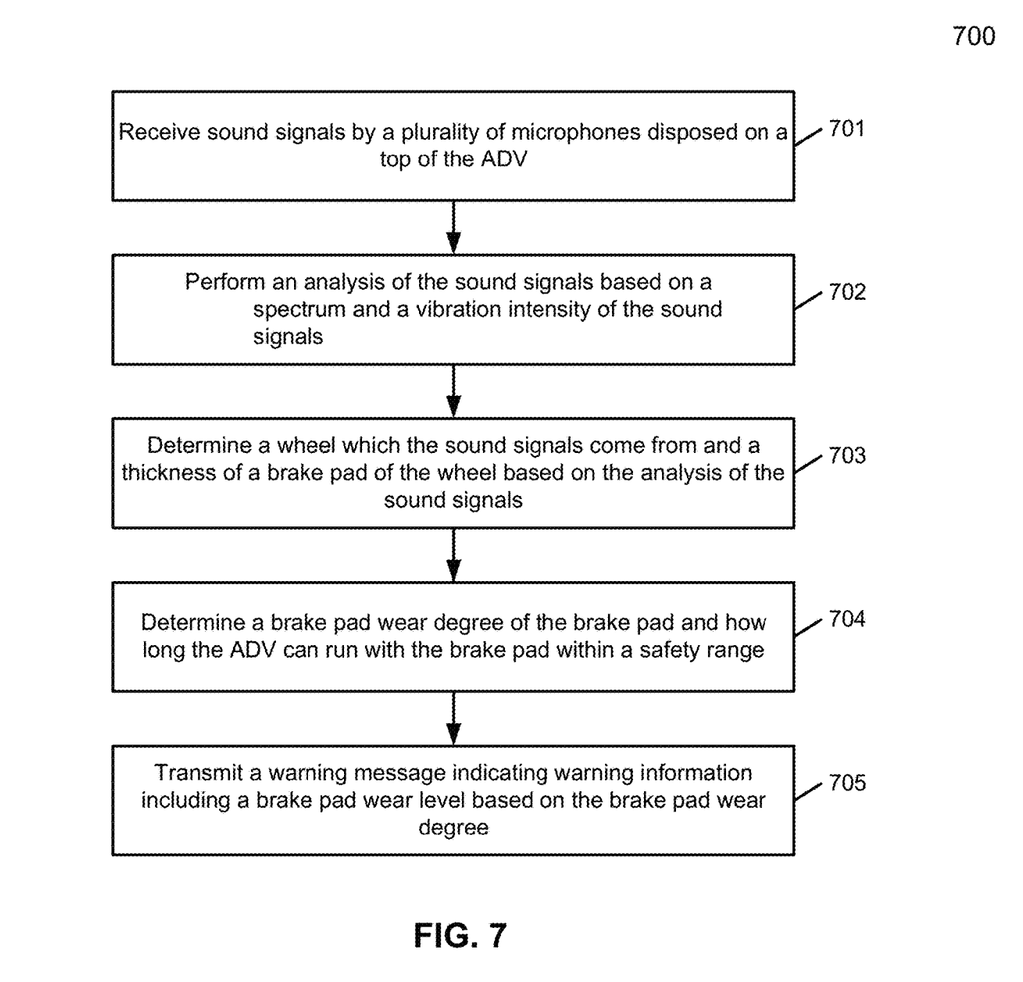
FIG. 7 is a flow diagram illustrating an example of a process for detecting a brake pad wear of an autonomous driving vehicle according to one embodiment.

FIG. 7 is a flow diagram illustrating an example of a process 700 for detecting a brake pad wear of an autonomous driving vehicle according to one embodiment. Process 700 may be performed by processing logic which may include software, hardware, or a combination thereof. For example, process 700 may be performed by microphone unit 216, sound detection module 308, and control module 306. By this process, the abrasion of a brake pad of an ADV may be detected quickly and an appropriate warning may be generated. The safety of the ADV may be improved.

Referring to FIG. 7, in operation 701, processing logic receives sound signals by a plurality of microphones disposed on a top of the ADV. In one embodiment, the plurality of microphones may be disposed at four corners on the top of the ADV.

In operation 702, processing logic performs an analysis of the sound signals based on a spectrum and a vibration intensity of the sound signals. In operation 703, processing logic determines a wheel which the sound signals come from and a thickness of a brake pad of the wheel based on the analysis of the sound signals. In operation 704, processing logic determines a brake pad wear degree of the brake pad and how long the ADV can run with the brake pad within a safety range based on the thickness of the brake pad. In one embodiment, processing logic may detect one or more predefined key words from a passenger of the ADV using speech recognition.

In operation 705, processing logic transmits a warning message indicating warning information based on the brake pad wear degree. In this way, the driving strategy is improved by automatically detecting the brake pad wear and generating the warning message timely.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
    receiving sound signals by a plurality of microphones disposed on a top of the ADV;
    performing an analysis of the sound signals based on a spectrum and a vibration intensity of the sound signals;
    determining a wheel which the sound signals come from and a thickness of a brake pad of the wheel based on the analysis of the sound signals;
    determining a brake pad wear degree of the brake pad and how long the ADV can run with the brake pad within a safety range based on the thickness of the brake pad; and
    transmitting a warning message indicating warning information based on the brake pad wear degree.

2. The method of claim 1, wherein the plurality of microphones are disposed at four corners on the top of the ADV.

3. The method of claim 1, further comprising
    determining whether the sound signals come from a brake pad of a plurality of brake pads of the ADV.

4. The method of claim 1, wherein the analysis of the sound signals is performed based on characteristics of a plurality of brake pads previously stored.

5. The method of claim 1, wherein the analysis of the sound signals is performed further based on vehicle information of the ADV.

6. The method of claim 1, further comprising
    preprocessing the sound signals including filtering and normalizing the sound signals.

7. The method of claim 1, further comprising
    detecting one or more predefined key words from a user of the ADV using speech recognition.

8. The method of claim 1, further comprising
    setting up a plurality of brake pad wear levels and a plurality of warning levels, wherein each brake pad wear level of the plurality of brake pad wear levels corresponds to a warning level of the plurality of warning levels.

9. The method of claim 8, further comprising
    determining a brake pad wear level of the plurality of brake pad wear levels and a waring level of the plurality of warning levels based on the brake pad wear degree.

10. The method of claim 9, further comprising
    generating the warning message based on the brake pad wear level, wherein the warning information is displayed based on the warning level.

11. A non-transitory machine-readable medium having instructions stored therein, which when executed by a processor, cause the processor to perform operations, the operations comprising:
    receiving sound signals by a plurality of microphones disposed on a top of an autonomous driving vehicle (ADV);
    performing an analysis of the sound signals based on a spectrum and a vibration intensity of the sound signals;
    determining a wheel which the sound signals come from and a thickness of a brake pad of the wheel based on the analysis of the sound signals;
    determining a brake pad wear degree of the brake pad and how long the ADV can run with the brake pad within a safety range based on the thickness of the brake pad; and
    transmitting a warning message indicating warning information based on the brake pad wear degree.

12. The non-transitory machine-readable medium of claim 11, wherein the plurality of microphones are disposed at four corners on the top of the ADV.

13. The non-transitory machine-readable medium of claim 11, wherein the operations further comprises
    determining whether the sound signals come from a brake pad of a plurality of brake pads of the ADV.

14. The non-transitory machine-readable medium of claim 11, wherein the operations further comprises
    detecting one or more predefined key words from a user of the ADV using speech recognition.

15. The non-transitory machine-readable medium of claim 11, wherein the operations further comprises
    setting up a plurality of brake pad wear levels and a plurality of warning levels,
        wherein each brake pad wear level of the plurality of brake pad wear levels corresponds to a warning level of the plurality of warning levels; and
    determining a brake pad wear level of the plurality of brake pad wear levels and a
        waring level of the plurality of warning levels based on the brake pad wear degree.

16. A data processing system, comprising:
    a processor; and
    a memory coupled to the processor to store instructions, which when executed by the processor, cause the processor to perform operations, the operations including
        receiving sound signals by a plurality of microphones disposed on a top of an autonomous driving vehicle (ADV);
        performing an analysis of the sound signals based on a spectrum and a vibration intensity of the sound signals;
        determining a wheel which the sound signals come from and a thickness of a brake pad of the wheel based on the analysis of the sound signals;
        determining a brake pad wear degree of the brake pad and how long the ADV can run with the brake pad within a safety range based on the thickness of the brake pad; and
        transmitting a warning message indicating warning information based on the brake pad wear degree.

17. The data processing system of claim 16, wherein the plurality of microphones are disposed at four corners on the top of the ADV.

18. The data processing system of claim 16, wherein the operations further include
    determining whether the sound signals come from a brake pad of a plurality of brake pads of the ADV.

19. The data processing system of claim 16, wherein the operations further include
    detecting one or more predefined key words from a user of the ADV using speech recognition.

20. The data processing system of claim 16, wherein the operations further include setting up a plurality of brake pad wear levels and a plurality of warning levels, wherein each brake pad wear level of the plurality of brake pad wear levels corresponds to a warning level of the plurality of warning levels; and determining a brake pad wear level of the plurality of brake pad wear levels and a waring level of the plurality of warning levels based on the brake pad wear degree.

\* \* \* \* \*